United States Patent [19]

Frazier

[11] 4,075,927
[45] Feb. 28, 1978

[54] TOOL ORIENTING AND RELEASE MECHANISM FOR MACHINE TOOL

[75] Inventor: James L. Frazier, Los Alamitos, Calif.

[73] Assignee: Houdaille Industries, Inc., Fort Lauderdale, Fla.

[21] Appl. No.: 629,217

[22] Filed: Nov. 6, 1975

[51] Int. Cl.² .................. B23Q 17/18; B23C 1/00
[52] U.S. Cl. .................. 90/11 D; 29/568; 279/1 A; 408/239 R
[58] Field of Search .......... 90/11 D, 11 A; 29/568, 29/26 A; 408/239; 279/1 A, 1 TS

[56] References Cited

U.S. PATENT DOCUMENTS

| Re. 26,623 | 7/1969 | Erikson | 90/11 A |
|---|---|---|---|
| 2,957,566 | 10/1960 | Brown | 82/28 B |
| 3,271,853 | 9/1966 | Pfister | 90/11 A |
| 3,520,228 | 7/1970 | Wohlfeil | 90/11 A |
| 3,593,614 | 7/1971 | Galbarini et al. | 90/11 A |
| 3,603,203 | 9/1971 | Rhodes | 90/11 A |
| 3,604,083 | 9/1971 | Antonietto et al. | 29/26 A |
| 3,651,739 | 3/1972 | Wolf | 90/11 D |
| 3,851,364 | 12/1974 | Noa et al. | 90/11 D |

*Primary Examiner*—Leonidas Vlachos
*Attorney, Agent, or Firm*—Hill, Gross, Simpson, Van Santen, Steadman, Chiara & Simpson

[57] ABSTRACT

A machine tool having a tool-supporting hollow spindle has the tool mounted in fixed relation to a draw bar which slides axially within the spindle between a tool retaining position and a tool release position. A barrel cam within the spindle is adapted to be engaged and rotated by a cam driver member secured to an actuating shaft longitudinally movable within the spindle. The spindle rotates with the cam until a predetermined angular position is reached, after which additional longitudinal movement of the actuating shaft causes movement of the draw bar downwardly within the spindle from its tool retaining position to its tool release position, where the tool is resiliently supported until it is removed, either manually or by automatic means.

23 Claims, 5 Drawing Figures

TOOL ORIENTING AND RELEASE MECHANISM FOR MACHINE TOOL

BACKGROUND

Field of the Invention

The present invention relates to machine tools and more particularly to a mechanism for permitting oriented insertion and release of tools in relation to a power driven spindle.

The Prior Art

It is desirable, in connection with machine tools, to orient a cutting tool to a predetermined position before it is released from the tool driving spindle. In all of such machines it is necessary to provide a mechanism for gripping a cutting tool during machining operations, and for releasing the cutting tool for removal and replacement. In most machines of this type two distinct mechanisms have been required for orientation and release — one for orienting the spindle, and the other for releasing the tool. This construction proves to be relatively complicated, and requires the provision of two separate actuator mechanisms.

Most previously known spindle orienting apparatus require that the spindle drive be interrupted at a predetermined time, and a brake applied, so that the spindle is stopped generally at the desired orientation, after which it is indexed further to the exact orientation desired. It is therefore necessary that the position of the spindle shaft be sensed during the period prior to interruption of the drive, the equipment provided for interrupting the spindle drive at precisely the correct time. If the spindle is not thereafter braked to a stop very near to the desired orientation, it is necessary to re-energize the spindle drive and make another try at stopping the spindle at the desired position. It is desirable to avoid the need for such apparatus if possible, so as to minimize manufacturing cost and complexity.

Typically, the release function of previously known machines is executed in a way that allows the cutting tool to drop out of its supporting mechanism if it is not otherwise supported at the time of release. This requires that additional supporting apparatus be synchronized with the release mechanism, and, where cutting tools are changed manually, the operator must be ready to catch the tool before it drops, even though one hand may be occupied with manual controls which bring about release of the tool. It is desirable to provide apparatus for supporting the tool, even after release, until it is removed.

BRIEF DESCRIPTION OF THE INVENTION

It is a principle object of the present invention to provide an apparatus and method for orienting the spindle of a machine tool and releasing the tool from the spindle, through the use of a single actuator mechanism.

Another object of the present invention is to provide a simple and economical structure for orienting the spindle of a machine tool to a predetermined position, irrespective of the position at which the spindle stops when the spindle drive is de-energized.

A further object of the present invention is to provide an actuator mechanism which is effective to orient the spindle of a machine tool, irrespective of the position in which the spindle stops when the spindle drive is de-energized, and subsequently releasing the tool from engagement with the spindle by the use of the same actuator mechanism.

Another object of the present invention is to provide a mechanism for supporting a tool after its release from the spindle, until it is removed by an independent agency.

These and other objects and advantages of the present invention will become manifest by an inspection of the following description and the accompanying drawings.

In one embodiment of the present invention there is provided a spindle for a machine tool comprising a hollow body of revolution, a draw bar adapted for longitudinal movement within the spindle, a plurality of tool retaining fingers secured to the draw bar and held in tool retaining position when the draw bar is at an upper position within the spindle, and a barrel cam secured to the spindle, and cooperating with a driver member secured to an actuating shaft, so that the cam and spindle are rotated to a predetermined angular position in response to movement of the actuating shaft from a first upper position to a lower intermediate position, the draw bar being adapted to be urged downwardly by further movement of said actuating shaft to a lower position within the spindle at which the tool retaining fingers resiliently support said tool.

BRIEF DESCRIPTION OF THE DRAWINGS

Reference will now be made to the accompanying drawings in which.

DESCRIPTION OF THE PREFERRED EMBODIMENT

Figure 1:
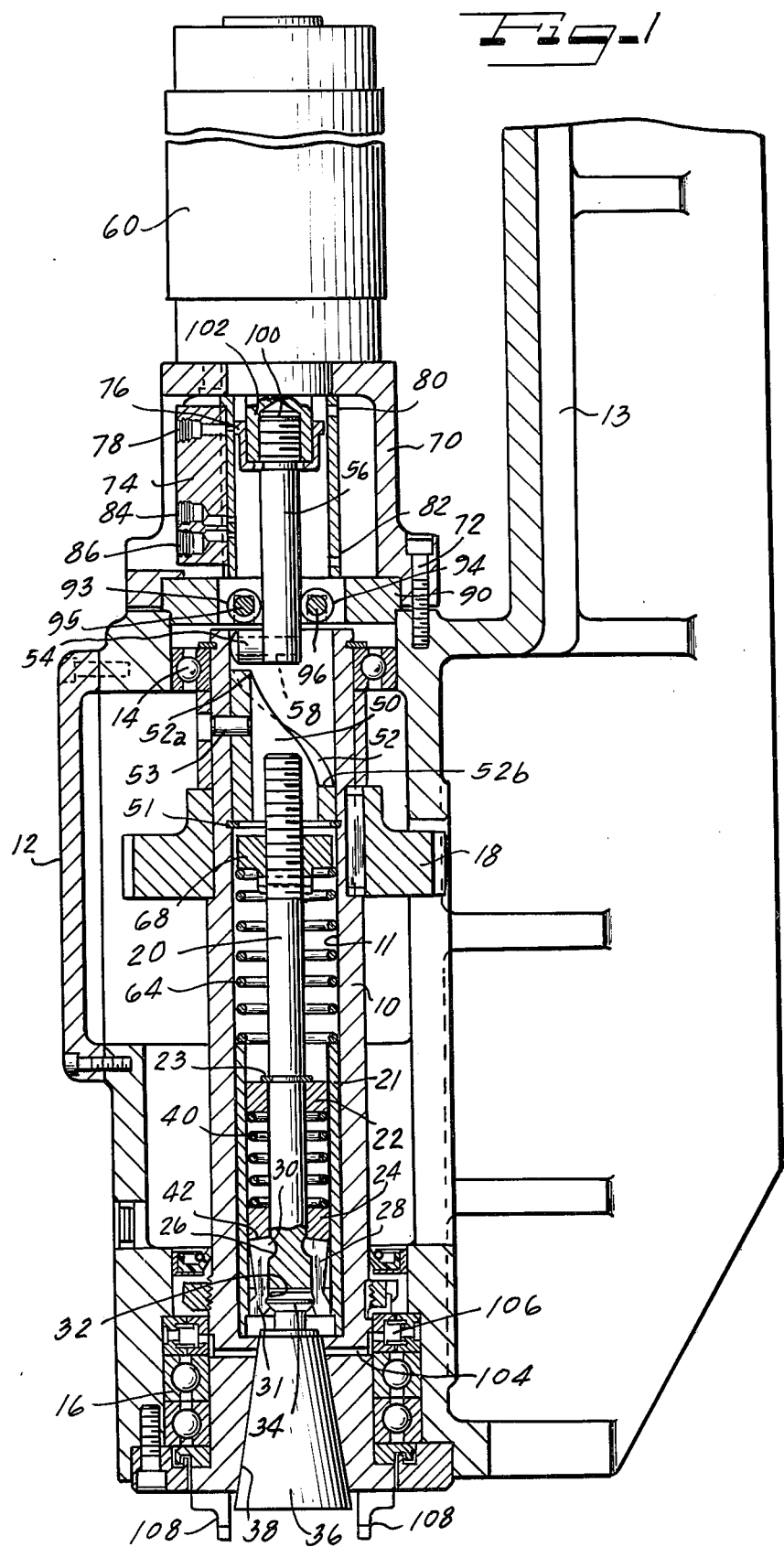
FIG. 1 is a vertical cross-sectional view of a portion of a machine tool incorporating an illustrative embodiment of the present invention, with the draw bar shown in tool retaining position.

FIG. 1 shows a portion of a machine tool having a spindle 10, in the form of a hollow body of revolution supported on a slide 12. The slide 12 has a set of upper bearings 14 and a set of lower bearings 16. The slide 12 is provided with ways 13 for movement in a vertical direction (by means not shown), to bring a cutting tool supported by the spindle 10 into contact with the work to be machined.

A drive gear 18 is keyed to the spindle 10, and is turned by a power source (not shown) to rotate the spindle 10 and a cutting tool to perform the desired machining operations. A draw bar 20 is supported within the hollow spindle 10, for slidable movement relative thereto in a longitudinal direction. An upper collar 22 and a lower collar 24 are mounted on the draw bar 20 to maintain the draw bar in coaxial alignment with the spindle 10 and retain spring 40.

The upper collar 22 is retained on the draw bar 20 by a snap ring 23 and slidingly received in the central bore 11 of a tool locking sleeve 21. The lower collar 24 slides relative to the draw bar 20, and also slides relative to the interior surface of a tool locking sleeve 21, inserted into the lower end of the bore 11.

Figure 5:
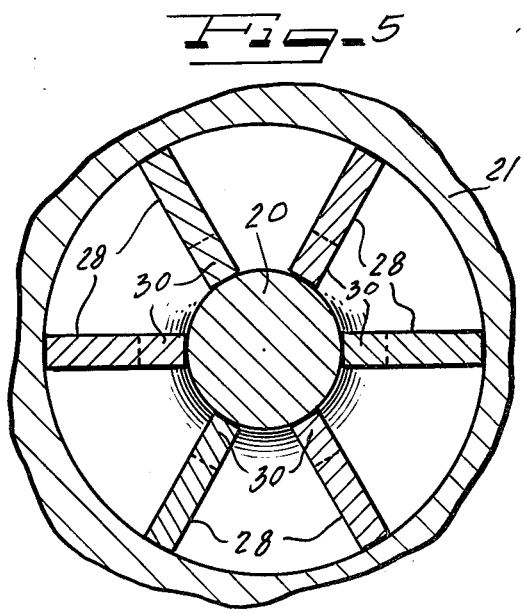
FIG. 5 is a horizontal cross-sectional view of a portion of the apparatus shown in FIG. 2 taken in the section V—V.

Just below the lower collar 24, the draw bar 20 is provided with a peripheral groove 26, which has a vertical cross-section in the form of a circular arc. A plurality of tool retaining fingers 28, having upper lugs 30 are positioned so that the lugs 30 are received in the groove 26. The lugs 30 are arcuate in shape, with the same radius of curvature as cross-section of the groove 26. Each of the fingers 28 extend downwardly within the tool locking sleeve 21, terminating in an enlarged end 31 with an inner notch 32, adapted to receive a flange 34 of a tool holder shank 36. The enlarged ends 31 have such a width that the flange 34 is securely gripped when the ends are within the sleeve 21, with the outer surfaces of the heads 31 bearing against the inner surface of the sleeve 21, as shown in FIG. 1. A cross-section is shown in FIG. 5.

A cutting tool is thereby securely held by the fingers 28 coaxially with the spindle 10. The tool holder (and tool) is prevented from moving in an upward direction by a conical surface 38 formed in the lower end of the spindle 10, which receives a corresponding conical surface on the tool holder shank 36. This also insures a coaxial relationship between the tool holder 36 and the spindle 10.

A tool retention spring 40 is disposed between the upper collar 22 and the lower collar 24, surrounding the draw bar 20, and urges the lower collar 24 downwardly relative to the draw bar 20, against the tops of the tool retaining fingers 28. The top surface of each of the fingers 28 is sloped downwardly and outwardly, and there is a corresponding sloping surface provided on the bottom surface of the lower collar 24. These two sloping surfaces are in parallel engagement with each other when the fingers 28 are in tool engaging position, as shown in FIG. 1, so that the effect of the spring 40 is to maintain the fingers in the position, relative to the tool holder, as illustrated in FIG. 1, even when the draw bar 20 is lowered so that the outer surfaces of the ends 31 of the fingers 28 move out of engagement with the sleeve 21.

As described in more detail hereinafter, such a downward movement of the draw bar 20 occurs during a tool release operation.

The upper end of the draw bar 20 is threaded and a nut 68 is received thereon. A tool locking spring 64 surrounds the draw bar 20 and is compressed between the nut 68 and the upper end of the tool locking sleeve 21. The force of the spring 64 normally keeps the draw bar 20 in its upper position. The force of the spring is regulated by the position of the nut 68 on the draw bar 20, and is adjusted by turning the nut, relative to the draw bar, until it is threaded to the desired position.

Within the hollow spindle 10, above the threaded end of the draw bar, a barrel cam 50 is mounted within the spindle 10, supported by a C-ring 51 engaged in a peripheral groove inside the bore 11, and pinned to the spindle by a pin 53, which is received in aligned apertures in the spindle 10 and the cam 50.

The cam 50 is constructed so that its transverse cross-section, at a point below the cam surface 52, defines inner and outer concentric circles. The cam surface 52 is the locus of a line normal to the axis of the draw bar 20, and has a single high point 52a and a single low point 52b. A cam driver member 54 is secured to the bottom of an actuating shaft 56. The driver member 54 comprises a roller mounted on a shaft 58 supported in a transverse bore near the end of the actuating shaft 56. The roller 54 is free to roll on the surface 52 of the barrel cam 50, as the actuating shaft 56 is lowered, during a tool release operation. The lowering of the actuating shaft 56 forces the barrel cam 50 to rotate thereby rotating the spindle and the tool gripped by the tool retaining fingers 28.

The actuating shaft 56 is connected to a piston within a hydraulic actuating cylinder 60, which is operated by hydraulic means (not shown).

Figure 4:
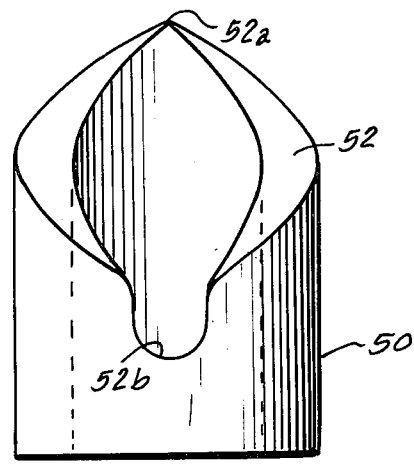
FIG. 4 is a side elevation of the barrel cam illustrated in FIGS. 1 and 2.

The lower surface 52 of the cam 50 is formed in the shape of a slot 52b (FIG. 4), with a size which just receives the roller 54, so that when the roller 54 enters the slot 52b, the cam 50 and spindle 10 have been properly oriented. At this point, the lower end of the shaft 56 engages the upper end of the draw bar 20. Further downward movement of the shaft 56 is resisted by the spring 64. When the downward force acting on the shaft 56 is insufficient to overcome the spring 64, spindle orientation is performed, but the tool is not released. The downward force acting on the shaft 56 is proportional to the hydraulic pressure within the cylinder 60, and is controllable by conventional means.

When tool release is desired, the hydraulic pressure is increased so that the shaft 56 can overcome the force of the spring 64, and begin to force the draw bar 20 downwardly.

Figure 2:
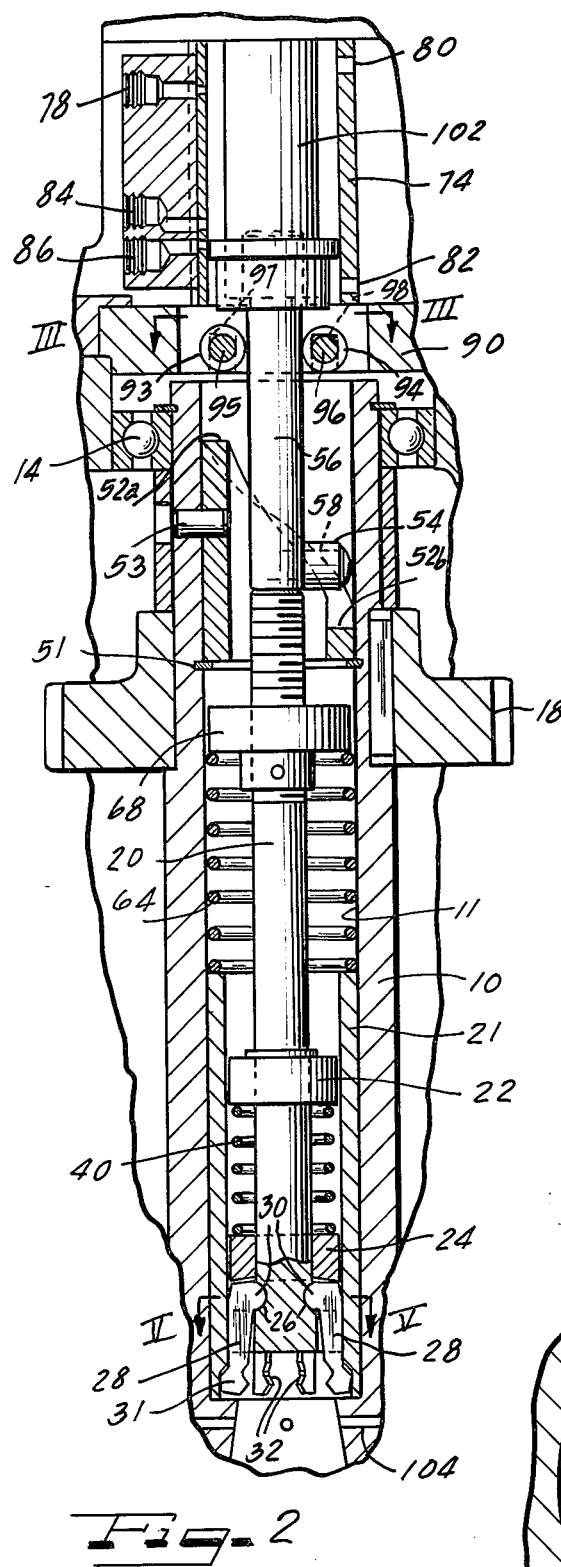
FIG. 2 is a vertical cross-section of a portion of the apparatus shown in FIG. 1, with the draw bar shown in tool supporting and releasing position.

As the draw bar 20 is forced downwardly against the force of the spring 64, it lowers the upper collar 22 together with the tool gripping fingers 28, so the tool retention spring 40 remains compressed and tends to keep the fingers 28 in the position shown in FIG. 1, even after the ends 31 of the fingers 28 are lowered so that their outer surfaces are not restrained by the sleeve 21. The tool holder (and the tool) is thus supported by the action of the spring 40, and the cooperating surfaces on the lower collar 24 and the fingers 28. The tool is resiliently supported and does not drop from the spindle under its own weight. It may, however, be removed by a slight downward force applied to the tool and tool holder, through an independent agency. This may be accomplished manually by an operator, or by operation of an automatic tool changing device. When such a force is applied, the fingers 28 are spread to the position illustrated in FIG. 2, permitting removal of the tool holder.

The cylinder 60 is mounted on a sensor housing 70 which is bolted to the top of the slide 12 by means of bolts 72. Within the sensor housing 70, a sensor sleeve 74 surrounds the actuating shaft 56 in coaxial and concentric relationship therewith. The sleeve 74 cooperates with a sensor ring 76. The sensor ring 76 is secured to the actuating shaft 56 within the sensor sleeve 74, and functions to open and close various ports in the sensor sleeve for providing a pneumatic indiction of the position of the actuating shaft 56. A first port 78 is located relatively high on the sensor sleeve 74, in position to be covered by the ring 76 when the actuating shaft 56 is in its upper position, as shown in FIG. 1, in which the cam driver member 54 is well above the cam 50, so that the spindle can be turned without affecting the shaft 56. At the beginning of a tool releasing operation, as the actuating shaft 56 moves downwardly to bring the cam driver member 54 into contact with the cam surface 52, the ring 76 moves down and the port 78 is opened. A passageway then extends between the port 78 and a port 80 disposed in the upper end of the sensor sleeve 74.

When the actuating shaft 56 has been lowered sufficiently to orient the cam 50 and the spindle 10, the sensor ring 76 moves down far enough to cover a port 84, and cut off the port 84 from communication with a port 82 in the sensor sleeve. Further downward movement of the shaft 56 opens the port 84 and allows it to communicate with the port 80. Further downward movement closes a port 86, disposed near the lower end of the sensor sleeve 74, to indicate that the draw bar 20 has been lowered far enough to permit release of the tool from the tool retention fingers 28. A supply of compressed air is applied to the ports 78, 84 and 86, and the ports 80 and 82 are open to the atmosphere. When one of the ports 72, 84 and 86 is blocked the increased pressure at the location of the blocked port is sensed by a pressure operated switch (not shown), which produces an electrical signal indicating the position of the actuating shaft 56 and draw bar 20. A separate switch is provided for each of the ports 78, 84 and 86.

When the lower port 86 is covered, signifying that the draw bar 20 is in its tool releasing position, the signal generated by closing the port 86 may be used to initiate operation of a mechanism (not shown) for automatically removing the tool from its position at the bottom of the spindle, and to substitute a new tool by raising the flange of the tool holder until it is gripped by the notches 32 in the fingers 28. When the actuating shaft 56 has been raised so as to cover the port 84, the covering of the port 84 indicates that the tool is positively retained, as a result of the upward movement of the draw bar 20, under the force of the spring 64, following the upward movement of the actuating shaft 56. Finally when the port 78 is again closed, an indication is given thereby that power may be reapplied to the spindle drive mechanism for rotating the spindle through the gear 18, since the driver member 54 is free of the cam 50.

Figure 3:
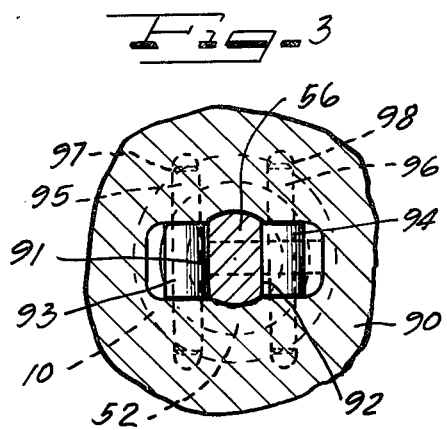
FIG. 3 is a horizontal cross-section of a portion of the apparatus illustrated in FIG. 2, taken in the section III—III.

An orient adjusting ring 90 is positioned between the slide 12 and the housing 70, and serves to determine the relative attitude of the cam drive member 54. As best shown in FIG. 3, the shaft 56 is not circular in cross-section, but has two parallel flat slides 91 and 92. These sides are engaged by a pair of rollers 93 and 94, which are supported by shafts 95 and 96 mounted in bores 97 and 98 provided in the ring 90. The ring 90 is clamped in position, when the bolts 72 are tightened, between the slide 12 and the housing 70, so that the shaft 56 cannot rotate. When the bolts 72 are loosened or removed, however, the ring 56 may be freely rotated relative to the slide 12 until it assumes the desired position. Normally, only one setting of the ring 90 is necessary, at the time of initial assembly of the machine, but the ring permits readjustment of the oriented position any time that is desired.

The shaft 56 is secured to a rod 102, attached to the piston within the cylinder 60, by means of a threaded connection, via threads 100.

Near the lower end of the spindle 10, four passageways 104, of which two are shown in FIG. 1, extend between the conical surface 36 and an annular chamber 106. This chamber 106 is preferably connected to a source of compressed air during the time that the draw bar 20 is moving upwardly under the force of the spring 64, to blow out any foreign matter and dust which may be present on the conical surface 36 and which might otherwise interfere with proper seating of the tool holder in place.

A pair of driving lugs 108 are secured to the lower end of the spindle, for engaging shoulders provided on the tool so that the tool is positively rotated by the spindle.

It is apparent that the present invention is effective in first orienting, and then releasably supporting, a tool in relation to the spindle, by one continuous motion of the single actuating shaft 56. The operation of the device is such that the tool is not released until it is properly oriented, but tool release follows immediately (if desired) after correct orientation has been received, by one continuous motion of the shaft 56. Since only one actuating shaft is involved, it is perfectly feasible for an operator to initiate operation of the actuating cylinder 60, by pressing a button or the like, and then have both hands free to extract and receive the tool from the spindle. Since the tool is always released in the same orientation, it is easy for the operator to replace the tool or substitute another tool in the same orientation. And since the tool remains resiliently supported until extracted, the operator need not extract the tool until he is ready to do so, and/or until he has both hands free to do so.

Since the cam surface 52 extends around the entire periphery of the upper surface of the cam 50, there is no need to stop the spindle in any particular orientation. Therefore, the spindle drive may be interrupted at any time, without regard to the position of the spindle, since the cam driver member 58 is effective to rotate the cam 50 toward its home position whatever the intial orientation of the cam 50. Because the cam driver member 54 is freely rotatable on the shaft 58, there is no dead position of the cam 50 which renders it incapable of being turned by the driver member 54.

In the foregoing it will be appreciated that the present invention furnishes an efficient and economical mechanism for orienting the tool and then releasing it from engagement with a spindle. It will be apparent that various modifications and additions will be made by others skilled in the art, without departing from the essential features involved of the present invention, which are intended to be defined and secured by the appended claims.

What is claimed is:

1. In a machine tool having a tool-supporting spindle, the combination comprising a draw bar supported by said spindle and adapted for longitudinal movement relative thereto between a tool retaining position and a tool release position, a plurality of tool retention fingers connected with the lower end of said draw bar adapted to assume a tool gripping position when said draw bar is in its tool retaining position and a tool release position when said draw bar is in its tool release position, a cam secured to said spindle, a cam driver member mounted on an actuating shaft adapted for longitudinal movement relative to said spindle, means for movng said actuating shaft so that said cam driver member is moved into engagement with said cam and then said actuating shaft is moved into engagement with said draw bar, whereby said cam and said spindle are rotated to a predetermined angular orientation, said draw bar being moved by said actuating shaft as said cam driver member moves beyond the point at which it engages said cam, whereby said draw bar is moved to its tool release position.

2. Apparatus according to claim 1, wherein said spindle has a central longitudinal bore, and said draw bar is supported within said bore for sliding movement relative to said spindle.

3. Apparatus according to claim 2, including means for resiliently biasing said draw bar toward its upper position.

4. Apparatus according to claim 3, including a shoulder mounted on said draw bar and a compression spring surrounding said draw bar and bearing against said shoulder and against said spindle for urging said draw bar toward its upper position.

5. Apparatus according to claim 4, wherein said shoulder is adjustably supported on said draw bar to permit adjustment of the force of said compression spring.

6. Apparatus according to claim 1, wherein said tool retaining fingers each have an arcuate lug received in a groove surrounding the periphery of said draw bar near its lower end, each of said fingers extending downwardly from said lug beyond the end of said draw bar for gripping the flange of a tool holder, said fingers being adapted to move, relative to said draw bar from tool gripping position to tool release position by rotation of said lugs within said groove.

7. Apparatus according to claim 6, including means for resiliently urging said fingers into tool gripping position.

8. Apparatus according to claim 6, wherein each of said fingers has an upper surface, a collar surrounding said draw bar above said fingers having a lower surface for engaging the upper surfaces of said fingers, and resilient means for urging said collar against said fingers and thereby urging said fingers into tool gripping position.

9. Apparatus according to claim 6, including a tool locking sleeve surrounding said draw bar and adapted to positively hold said tool retaining fingers in tool gripping position when said draw bar is in its upper position.

10. In a machine tool having a tool-supporting spindle, the combination comprising a draw bar supported by said spindle and adapted for longitudinal movement relative thereto between a tool retaining position and a tool release position, a plurality of tool retention fingers connected with the lower end of said draw bar adapted to assume a tool gripping position when said draw bar is in its tool retaining position and a tool release position when said draw bar is in its tool release position, a cam secured to said spindle, a cam driver member adapted for longitudinal movement relative to said spindle, means for moving said cam driver member into engagement with said cam, whereby said cam and said spindle are rotated to a predetermined angular orientation, and means for moving said draw bar in response to movement of said cam driver member, whereby said draw bar is moved to its tool release position, wherein said spindle has a central longitudinal bore, and said cam is a hollow barrel cam mounted coaxially within said bore, and including an actuating shaft mounted in axial alignment with said bore, said barrel cam having a cam surface on its upper end having one high point and one low point, said cam driver member being mounted on said actuating shaft and radially offset therefrom for engaging the cam surface of said barrel cam and for rotating said cam until the low point on said cam surface is aligned with said cam driver member.

11. Apparatus according to claim 10, wherein said cam driver member comprises a roller adapted for rolling engagement with the cam surface of said barrel cam.

12. Apparatus according to claim 11, wherein said cam surface is formed with its low point at the bottom of a downwardly extending slot, whereby downward movement of said cam driver member first rotates said cam until said cam driver member is aligned with said slot, after which the angular position of said cam remains fixed during further downward movement of said cam driver member into said slot.

13. Apparatus according to claim 10, including means for restraining said actuating shaft from rotation, whereby said cam driver member rotates said cam to a fixed angular position.

14. Apparatus according to claim 13, wherein said actuating shaft is non-circular in cross-section, and including a ring secured to the frame of said machine tool and surrounding said actuating shaft for preventing said actuating shaft from rotating relative to said spindle.

15. Apparatus according to claim 14, wherein said ring has a circular periphery and said frame has a circular opening coaxial with said actuating shaft for receiving said ring in angularly adjustable relationship, and means for selectively clamping said ring to said frame for securing said ring rigidly to said frame.

16. Apparatus according to claim 1, wherein said spindle has a central longitudinal bore, and including means for mounting said draw bar within said bore for longitudinal movement relative thereto, said cam comprising a hollow barrel cam fixed to said spindle within said bore and surrounding the upper end of said draw bar, and an actuating shaft mounted for longitudinal movement within said bore, and adapted to move into contact with the upper end of said draw bar for forcing said draw bar downwardly, said cam driver member being mounted on said actuating shaft for engaging the cam surface of said barrel cam during downward movement of said actuating shaft, whereby said spindle is oriented by rotating said cam before said actuating shaft engages said draw bar.

17. Apparatus according to claim 1, including an actuating shaft mounted for longitudinal movement relative to said spindle for engaging said draw bar and moving it from its tool retaining position to its tool release position, said cam driver member being mounted on said actuating shaft for engaging and rotating said cam during movement of said actuating shaft, a sensor sleeve surrounding said actuating shaft, and a sensor ring mounted on said actuating shaft within said sleeve, said sleeve having a plurality of apertures spaced along said sleeve in a longitudinal direction relative to said actuating shaft, and said ring having a flange adapted to cover each of said apertures during movement of said actuating shaft.

18. Apparatus according to claim 17, wherein one of said apertures is located on said sleeve in position to be covered when said actuating shaft is out of engagement with said draw bar and out of engagement with said shaft, for furnishing a signal indicating that condition of the actuating shaft.

19. Apparatus according to claim 17, wherein one of said apertures is located on said sleeve in position to be covered when said actuating shaft has moved so as to rotate said cam but has not moved said draw bar, for furnishing a signal indicating that condition of the actuating shaft.

20. Apparatus according to claim 17, wherein one of said apertures is located in position to be covered when said actuating shaft has moved so as to move said draw bar to its tool release position, for furnishing a signal indicating that condition of the actuating shaft.

21. In a machine tool having a tool-supporting spindle, the combination comprising a cam secured to said spindle, a cam driver member adapted for longitudinal movement relative to said spindle, and actuating means for moving said cam driver member into engagement with said cam, whereby said cam and said spindle are rotated to a single predetermined angular orientation, irrespective of the initial position of said spindle, said spindle having a longitudinal central bore therein, said cam comprising a barrel cam secured to said spindle within said bore, and said actuating means comprising a shaft mounted for longitudinal movement within said bore.

22. Apparatus according to claim 21, wherein said actuating means comprises a shaft mounted for longitudinal movement relative to said spindle, said shaft having a noncircular cross-section, and a ring secured to the frame of said machine tool in angularly adjustable relationship and having an aperture for receiving said shaft and allowing reciprocal but not rotary movement relative thereto.

23. Apparatus according to claim 21, including means operable in response to longitudinal movement of said cam driver member for producing a signal indicating the position of said cam driver member relative to said cam.

* * * * *